United States Patent [19]

Wohlfeil

[11] 4,434,941

[45] Mar. 6, 1984

[54] SEALING SYSTEM FOR THE AIR FEED OF A ROTATABLE AIR NOZZLE SYSTEM

[75] Inventor: Gerhard Wohlfeil, Monheim, Fed. Rep. of Germany

[73] Assignee: Jagenberg Werke Ag, Dusseldorf, Fed. Rep. of Germany

[21] Appl. No.: 327,874

[22] Filed: Dec. 7, 1981

[30] Foreign Application Priority Data

Dec. 19, 1980 [DE] Fed. Rep. of Germany ....... 3048134

[51] Int. Cl.³ .............................................. B05B 15/08
[52] U.S. Cl. .................................. 239/587; 277/81 R; 277/92; 239/597
[58] Field of Search .................. 239/587, 597; 34/160, 34/222, 229; 277/8 R, 92, 95

[56] References Cited

U.S. PATENT DOCUMENTS 2,137,104 11/1938 Zademach ............................. 34/229
2,139,628 12/1938 Terry ............................... 239/587 X
2,940,418 6/1960 Penrod et al. ..................... 239/597 X
3,736,669 6/1973 Amidon, Jr. et al. ............. 34/222 X

FOREIGN PATENT DOCUMENTS 311631 5/1929 United Kingdom .................. 277/92

Primary Examiner—John J. Love
Assistant Examiner—Mary F. McCarthy
Attorney, Agent, or Firm—Sprung, Horn, Kramer & Woods

[57] ABSTRACT

A system for the axial feed of air to one of two air nozzles (7, 7) which together are rotatable about a longitudinal center axis (4), comprising a housing (6) having a pair of stationary air feed ducts (10, 11) each of the ducts terminating in a thrusting surface (19) perpendicular to the longitudinal center axis of the air nozzle, a gasket retainer (21) spaced from the thrusting surface, a compressible gasket (20) between the thrusting surface and the gasket retainer, and a rotatable hollow journal (23) for carrying the air nozzles at its downstream end and at its upstream end being pressed against the gasket retainer.

7 Claims, 2 Drawing Figures

SEALING SYSTEM FOR THE AIR FEED OF A ROTATABLE AIR NOZZLE SYSTEM

BACKGROUND OF THE INVENTION

The invention relates to a sealing system for the axial feed of air to an air nozzle system which has at least one slot nozzle and is rotatable about its central longitudinal axis for the removal of excess liquid coating material from a moving web of material and for smoothing the coating.

In such rotatable air-nozzle systems, problems occur in the area of the seal between the stationary air feed passage and the rotatable casing of the air nozzle system as a consequence of unavoidable sagging of the air nozzle system which heretofore have not been solved in a satisfactory manner.

THE INVENTION

It is the object of the invention to create a sealing system of the kind described hereinabove, which, although of simple construction, will provide a faultless air seal in the area of the transition between the stationary and rotatable parts of the air nozzle system.

This object is achieved in accordance with the invention in that thrusting surfaces perpendicular to the longitudinal center axis are provided at the end of the stationary air feed duct, and gaskets of resiliently compressible material are placed thereon, that a gasket retainer holds the gaskets of resiliently compressible material with radial clearance, and that the gasket retainer is urged against the gaskets of resiliently compressible material by pressure surfaces perpendicular to the longitudinal center axis of the air nozzle system of a hollow journal of the air nozzle system.

This results in an excellently tight, virtually maintenance-free and long-lasting sealing system.

Advantageously, the pressure against the gaskets of resiliently compressible material between the hollow journal and a stationary flange provided with the thrusting surfaces at the end of the stationary air feed duct is adjustable by means of traction screws and thrust screws which abut against a lever.

It is desirable for the gaskets of resiliently compressible material to have such a thickness that they are able to accommodate an axial movement of 6 mm and a deflection of 2°. In this manner the movements occurring as a result of sagging in known air-nozzle systems are completely compensated.

The gaskets of resiliently compressible material are advantageously sponge rubber gaskets.

In a sealing system for an air-nozzle system having two slot nozzles disposed diametrically opposite one another and two stationary air feed ducts of different cross section, it is desirable that both air feed ducts be sealed off from one another by means of gaskets of resiliently compressible material and corresponding thrusting surfaces and the gasket retainer while the hollow journal of the air nozzle system has two separate air ducts each leading to a slot nozzle.

Lastly, the hollow journal of the air nozzle system is advantageously mounted in a ball joint.

DETAILED DESCRIPTION OF THE DRAWING

Figure 1:
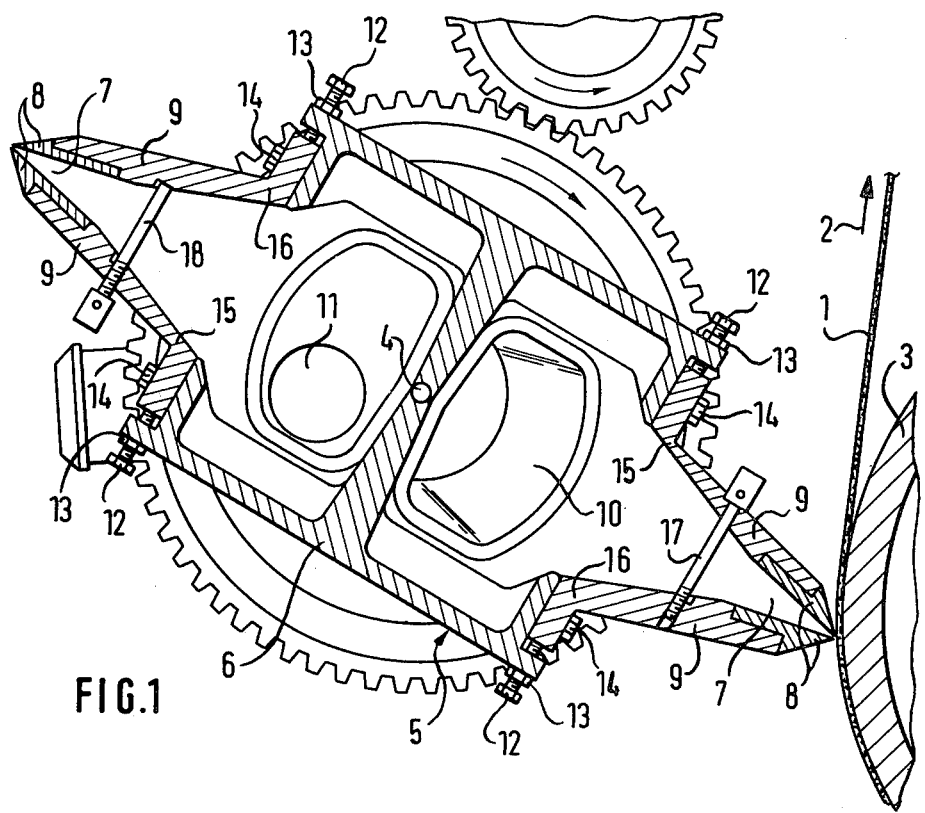
Figure 2:
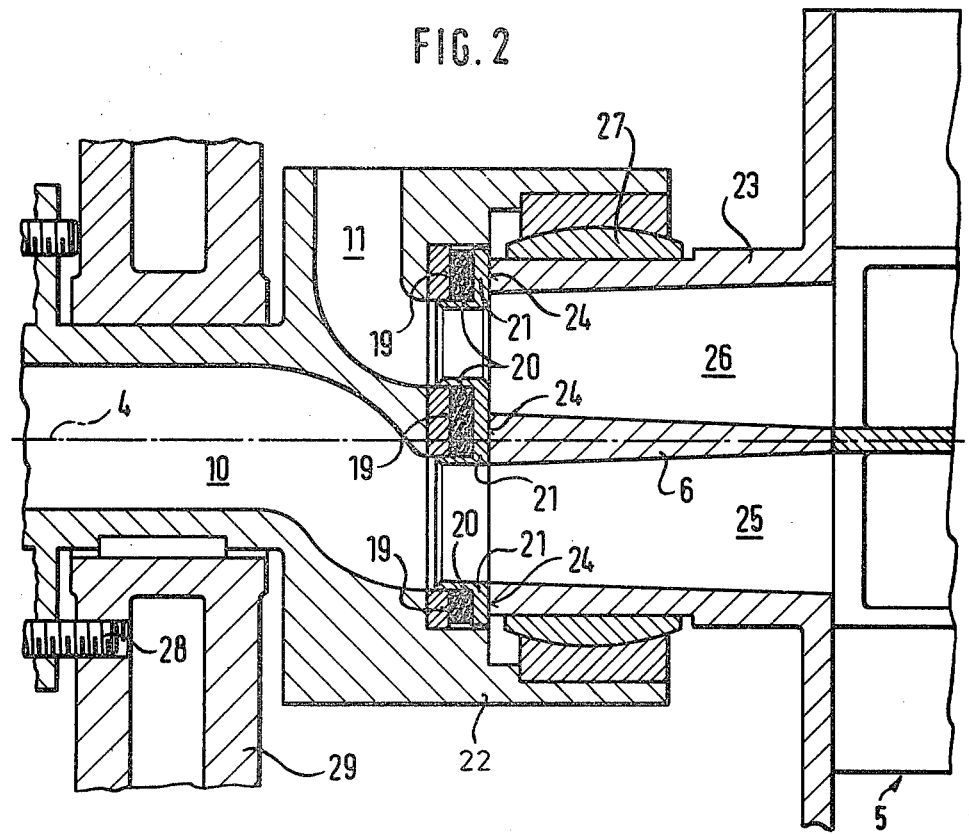

The invention will be further explained herewith in conjunction with an embodiment represented in the drawings, wherein:

FIG. 1 is a cross section of a coating apparatus having an air nozzle system which is preferentially provided with a sealing system of the invention, and FIG. 2 shows an embodiment of the sealing system of the invention in an air nozzle system in accordance with FIG. 1.

In the coating apparatus represented in FIG. 1, a web 1 of material to be coated moves in the direction of the arrow 2 over a counter roll 3. For the removal of excess coating material from the web 1 and for the smoothing of the coating, there is provided an air nozzle system 5 which is rotatable about its longitudinal center axis 4 and has a casing 6, and which has a slot nozzle 7 with nozzle lips 8 extending over at least the width of the web on each side of the longitudinal center axis 4, each nozzle displaced 180° relative to the other. The nozzle lips 8 are seated on nozzle-lip holders 9 of angular construction which in turn are mounted for displacement and adjustment relative to the casing 6 in the direction of the nozzle-slot width.

The air feed to the slot nozzle 7 directed toward the counter roll 3 is through a feed duct 10 for primary air, while the air feed to the slot nozzle 7 directed away from the counter roll 3 is through a feed duct 11 for cleaning air. The cleaning-air feed duct 11 is of smaller cross section than the primary-air feed duct 10. This air-nozzle arrangement permits the slot nozzle 7 which is not in use to be cleaned and, if necessary, adjusted while the apparatus is in operation. The cleaned slot nozzle 7 can then readily and quickly be rotated into its operating position at the counter roll 3, following which the slot nozzle 7 which was in use before can be cleaned and adjusted.

The nozzle-lip holders 9 can readily be positioned and adjusted relative to the casing 6 in the direction of the nozzle-slot width by means of adjusting screws 12 and lock nuts 13. When properly positioned, they can be fixed in position by means of setscrews 14. These positioning means permit precise rectilinear positioning of the nozzle lips 8.

The nozzle-lip holder 9 which is the upper one when the slot nozzle 7 is directed toward the counter roll 3 has a cross section over the angled area 15 that is smaller than the cross section of the lower nozzle-lip holder 9 over the angled area 16. The legs of the nozzle-lip holders 9 which extend beyond the casing 6 are interconnected through traction screws 17 and thrust screws 18 distributed over the length of the slot nozzle 7. Fine adjustment of the width of the nozzle slot can be readily secured through these traction and thrust screws. The nozzle-lip holder 9 with the larger cross section over the angled area 16 provides a substantially unyielding base line for such nozzle width adjustment.

FIG. 2 shows a sealing system of the invention in an air-nozzle system 5 of FIG. 1. Vertical thrusting surfaces 19 perpendicular to the longitudinal center axis 4 of the air nozzle arrangment 5 are provided at the end of the stationary air feed ducts 10 and 11. On these pressure surfaces 19 are seated gaskets 20 of resiliently compressible material, preferably sponge rubber gaskets. The gaskets 20 are held in place with radial clearance by a gasket retainer 21. The thrusting surfaces 19 are provided on a stationary flange piece 22 having the air feed ducts 10 and 11. The flange piece 22 is pressed adjustably against the gaskets 20 of resiliently compressible material by means of traction screws and thrust screws 28 which abut against a lever 29.

A hollow journal 23 in the casing 6 of the air-nozzle system 5 likewise has surfaces 24 perpendicular to the longitudinal center axis 4 of the air nozzle system 5, and by means of these surfaces the gasket retainer 21 is pressed against the gaskets 20 of resiliently compressible material. The gaskets 20 are of such thickness that they are able to accommodate sealingly an axial movement of 6 mm and a deflection of 2° on the part of the hollow journal 23. By means of the gasket retainer 21 and the corresponding gaskets 20, the two air feed ducts 10 and 11, which lead into two separate air ducts 25 and 26 each leading to a slot nozzle 7, are sealed off from one another.

The hollow journal 23 is mounted in a ball joint 27 so as to be rotatable with respect to the stationary parts of the air nozzle system.

The sealing system of the invention in a simple manner provides a completely air-tight transition between the stationary and the rotatable parts of the air nozzle system.

It will be appreciated that the instant specification and claims are set forth by way of illustration and not of limitation, and that various modifications and changes may be made without departing from the spirit and scope of the present invention.

What claimed is:

1. In combination; a system for sealing and axially feeding air to an air nozzle system for the removal of excess liquid coating material from a moving web of material and for smoothing the coating, the air nozzle system comprising a housing rotatable about its longitudinal center including a pair of air slot nozzles disposed diametrically opposite one another and comprising two stationary air feed ducts sealed from one another by gaskets of resiliently compressible material with rectangular cross section and which are seated on thrusting surfaces perpendicular to the longitudinal center axis of the air nozzle system at the end of the stationary air feed ducts, the gaskets are overlapped with radial clearance by gasket retaining and pressing means, and the gasket retaining and pressing means are pressed against the gaskets of resiliently compressible material by pressure surfaces provided on a rotatable hollow journal of the air nozzle system perpendicular to the longitudinal center axis of the air nozzle system, the journal having two separate air ducts each leading to a slot nozzle and serving to connect one of the air feed ducts to one nozzle through one air channel, rotation of the journal connecting said one nozzle and its channel to the other nozzle.

2. A combination according to claim 1, including a stationary flange piece which carries the thrusting surface, a lever for adjusting the axial compression of the gasket between the thrusting surface and the gasket retaining and pressing means, and adjustable tension and thrust screws acting on the lever to effect compression adjustment.

3. A combination according to claim 1, wherein the gaskets of resiliently compressible material are of such thickness as to be able to accommodate a displacement of 6 mm in axial direction and a tilt of 2°.

4. A combination according to claim 1, wherein the gaskets are formed of sponge rubber.

5. A combination according to claim 1, wherein the hollow journal of the air nozzle system is mounted in a ball joint for rotational movement.

6. A combination according to claim 1, wherein the two stationary air feed ducts are of different cross section.

7. A combination according to claim 6, wherein the journal is mounted in a ball joint for rotational movement.

* * * * *